United States Patent [19]

Pachter

[11] 4,150,544
[45] Apr. 24, 1979

[54] ENGINE

[76] Inventor: John J. Pachter, 36 Faye Ave., Shelby, Ohio 44875

[21] Appl. No.: 732,471

[22] Filed: Oct. 14, 1976

[51] Int. Cl.² .............................................. F03G 7/06
[52] U.S. Cl. ..................................................... 60/527
[58] Field of Search .................................. 60/527, 529

[56] References Cited

U.S. PATENT DOCUMENTS

| | | | |
|---|---|---|---|
| 1,602,068 | 10/1926 | Daub | 60/527 |
| 2,931,189 | 4/1960 | Sigworth | 60/527 |
| 3,303,642 | 6/1965 | Lee | 60/527 X |
| 3,316,415 | 4/1967 | Taylor | 60/529 X |
| 3,321,908 | 5/1967 | Katchalsky et al. | 60/527 |
| 4,010,612 | 3/1977 | Sandoval | 60/527 |

FOREIGN PATENT DOCUMENTS 478123  6/1975  U.S.S.R. ..................................... 60/529

*Primary Examiner*—Allen M. Ostrager
*Assistant Examiner*—Stephen F. Husar
*Attorney, Agent, or Firm*—Jerome R. Cox; Sidney W. Millard

[57] ABSTRACT

An engine for converting temperature differentials to power or for converting power to heating or cooling. In the more obvious use, heat is applied to designated segments of metal belts to cause the designated segments to expand for the conversion of heat to power. If desired, cooling fluid is also applied to other segments of said belts to cause these other segments to contract and thus cooperate with the above stated application of heat in the conversion of temperature differences to power. In the preferred embodiment, two pairs of pulleys are provided. The two pulleys of each pair are mounted on and keyed to a common shaft. The two shafts are spaced apart but are parallel to each other. One of the pair of belts extends around one pulley of each pair and the other belt extends around the other two pulleys. The belts are positioned in planes parallel to each other. One pulley of each pair is larger than the other pulley of the pair to which it is connected by the associated shaft. The said larger pulley is also larger than the pulley to which it is connected by the associated belt. In another embodiment, only one pair of pulleys is provided and a bimetallic belt goes around this pair of pulleys.

2 Claims, 11 Drawing Figures

ENGINE

BACKGROUND OF THE INVENTION

It is well known that many substances, whether gaseous, liquid or solid, tend to expand when heated. Although there are exceptions, most gases and liquids (under constant pressure) tend to expand when heated. Most metals also tend to expand when heated. This tendency of liquids and gases to expand when heated is utilized in producing power from heat. One common example is the steam engine. Also, it has been proposed to produce power from differentials in temperature by the tendency of some solids to increase in size when heated or cooled. The invention disclosed and claimed herein relates to power produced by the application of differentials in temperature to metal belts.

This invention relates to the art of heat engines and particularly to one of a type utilizing thermal expansion and contraction of metal belts to effectuate its actuation.

It is an object of this invention to provide a relatively simple heat engine which has a minimum of moving parts and which operates directly upon the application of heat to portions of one or more continuous metal belts so that such portions of each belt lengthen due to thermal expansion; while other portions of each belt are cooled to cause such portions to shorten due to thermal contraction. The belt or belts are passed around pulleys which are caused to be rotated by the action of the belts as different portions of such belts lengthen and shorten.

It is another object of the invention to provide an improved heat engine of the type mentioned whereby only a temperature differential is required without requiring a high combustion temperature as in a gasoline or other fuel type engine, although devices of my invention are also operative with such high temperatures.

It is another object to provide such a heat engine wherein each continuous belt which is lengthened and shortened in different portions by thermal means is wrapped around a pair of oppositely positioned pulleys of different diameters, one pulley being of slightly smaller diameter than the other. The pulley shaft of each pulley is connected to a pulley shaft of the pulley of another pair to assure the same angular velocity of the pulleys, although the linear velocities of the belts change throughout their lengths due to their lengthening and shortening.

Other objects and advantages of the invention should become apparatus upon reference to this description and claims and to the accompanying drawings.

DESCRIPTION OF SIMPLIFIED REPRESENTATIONS

Figure 1:
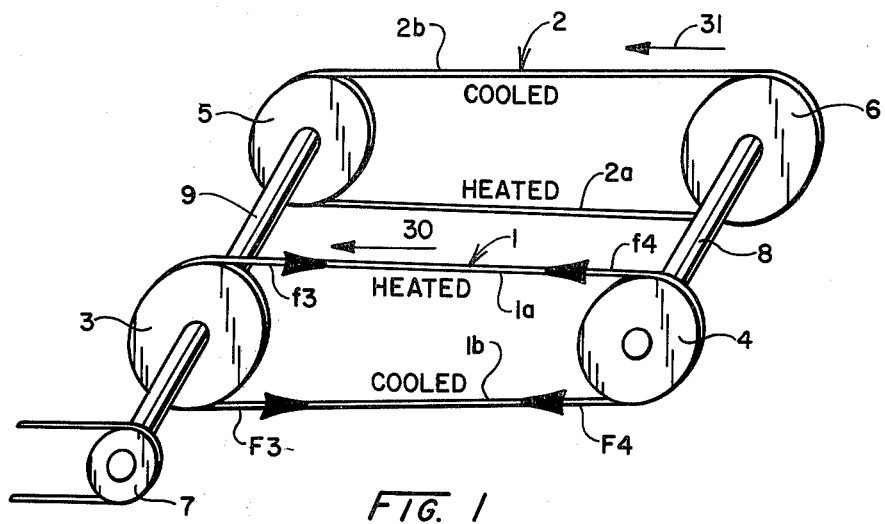
FIG. 1 shows a simplified representation of features of an engine to illustrate the principles of operation of my engine.

As shown in FIG. 1, there are provided two metal belts 1 and 2 and five pulleys 3, 4, 5, 6 and 7. Shafts 8 and 9 are provided. Pulleys 3, 5, and 7 are mounted on shaft 9 and are keyed thereto so that the pulleys 3, 5 and 7 and the shaft 9 rotate as a unit. Pulleys 4 and 6 are mounted on and keyed to shaft 8 so that the pulleys 4 and 6 and shaft 8 rotate as a unit. Pulleys 3 and 6 are larger than pulleys 4 and 5. Pulley 3 preferably but not necessarily has a diameter equal to the diameter of pulley 6. Pulley 4 preferably but not necessarily has a diameter equal to the diameter of pulley 5. Metal belt 1 follows a continuous path around pulleys 3 and 4. Metal belt 2 follows a continuous path around pulleys 5 and 6. Pulley 7 on the end of shaft 9 provides means of taking power off from the engine. This pulley is used as a driving pulley for some externally driven device requiring a motor driven away from pulley 3.

The rotation of the pulleys is accomplished by heating and cooling of selected portions of the belts 1 and 2. Belt 1 causes rotation of pulleys 3 and 4 as heat is applied to region 1a and extracted from region 1b of the belt. Movement of the belt is in the direction of the arrow 30. Belt 2 causes rotation of the pulleys 5 and 6 as heat is applied to region 2a and extracted from region 2b. Its direction of movement is in the direction of arrow 31 which is the same direction of movement as for belt 1. The rotation of the pulleys 3 and 5 causes shaft 9 and the pulley 7 to be rotated to thereby transmit motion to an external object required to be driven.

As will be explained later, the force acting on shaft 9 through pulley 3 as a result of the fact that the force of the contraction of segment 1b of belt 1 is greater than the force acting on shaft 9 through the segment 1a. The segment 1a is expanded due to heat thus reducing the tension in segment 1a on shaft 9. Also, the force acting on pulley 5 as a result of the contraction of segment 2b is greater than the force acting on pulley 5 through the segment 2a because the tension of segment of 2a is reduced by its expansion due to heat applied thereto. However, the force acting on shaft 9 through pulley 5 is less than the force acting on pulley 3 because of the shorter radius of pulley 5. This causes pulleys 3 and 5 and axle 9 to turn counter clockwise as viewed in FIG. 1.

The expansion of segment 1a and contraction of segment 1b also exerts force to tend to turn pulley 4 clockwise. The expansion of segment 2a and contraction of segment 2b exerts force to tend to turn pulley 6 counter clockwise. However, because of the greater diameter of pulley 6, the net effect is to turn pulley 4 and pulley 6 and shaft 8 counter clockwise.

Figure 2:
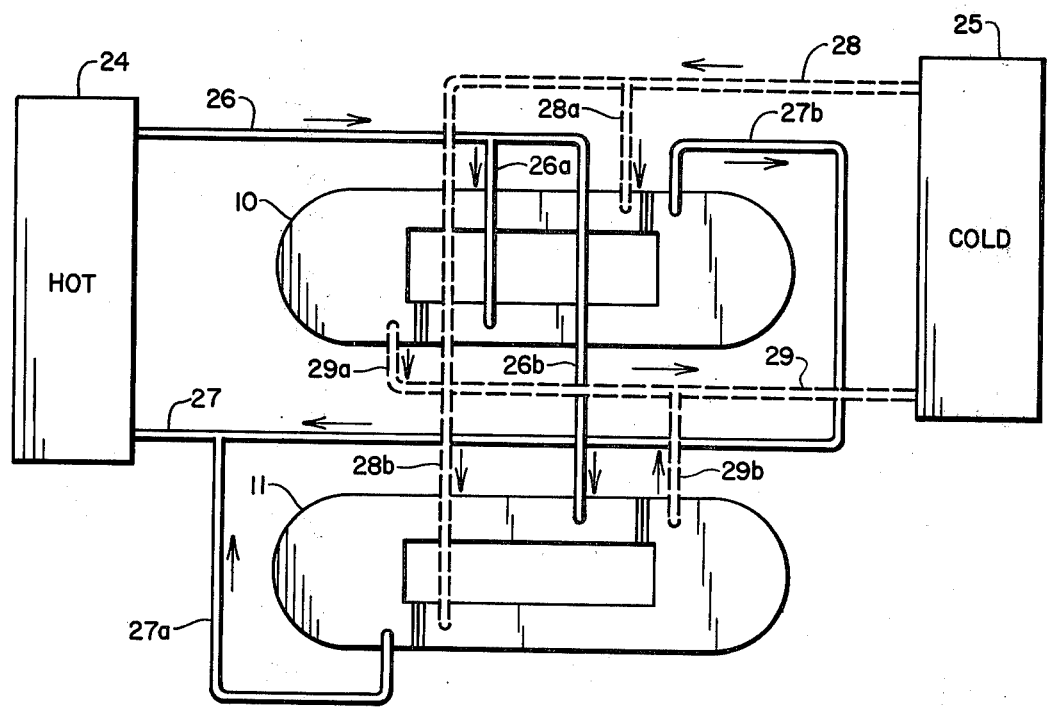
FIG. 2 shows another diagrammatic representation of the engine illustrating especially the piping by which heat and cooling is directed to various segments of the engine.

In FIG. 2 there is illustrated the piping used in heating segments 1a and 2a and used in cooling segments 1b and 2b. A heater 24 delivers heated fluid through pipes 26 and 26a to segment 2a and delivers heated fluid through pipes 26 and 26b to segment 1a. A cooler 25 delivers cooled fluid through pipes 28 and 28a to segment 2b and through pipes 28 and 28b to segment 1b. Heating fluid may be recirculated back to the heater through pipes 27a, 27b and 27 and cooling fluid recirculated back to the cooler through pipes 29a, 29b and 29 although if desired such spent fluid may be exhausted to the atmosphere.

DESCRIPTION OF THE PREFERRED EMBODIMENT

Figure 3:
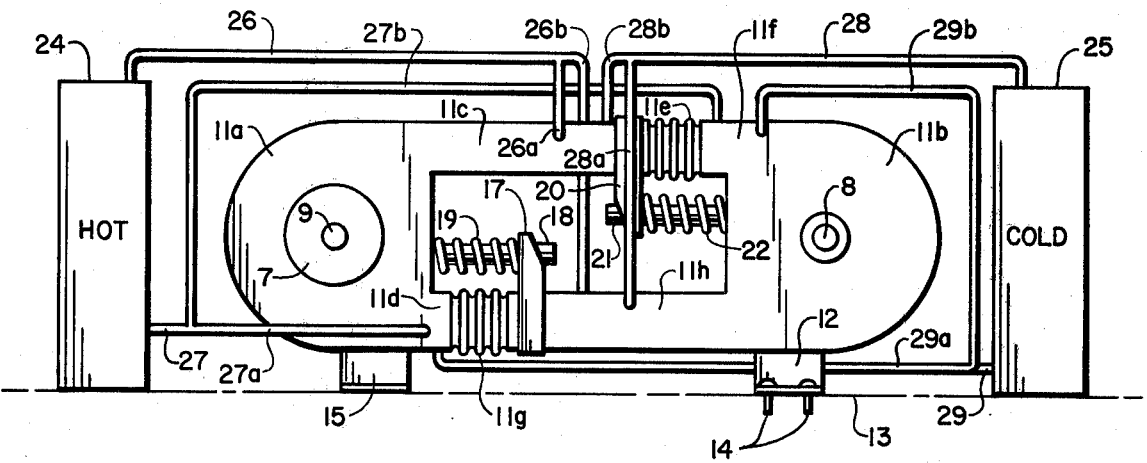
FIG. 3 shows in detail a side elevation of a complete heat engine embodying the invention.
Figure 4:
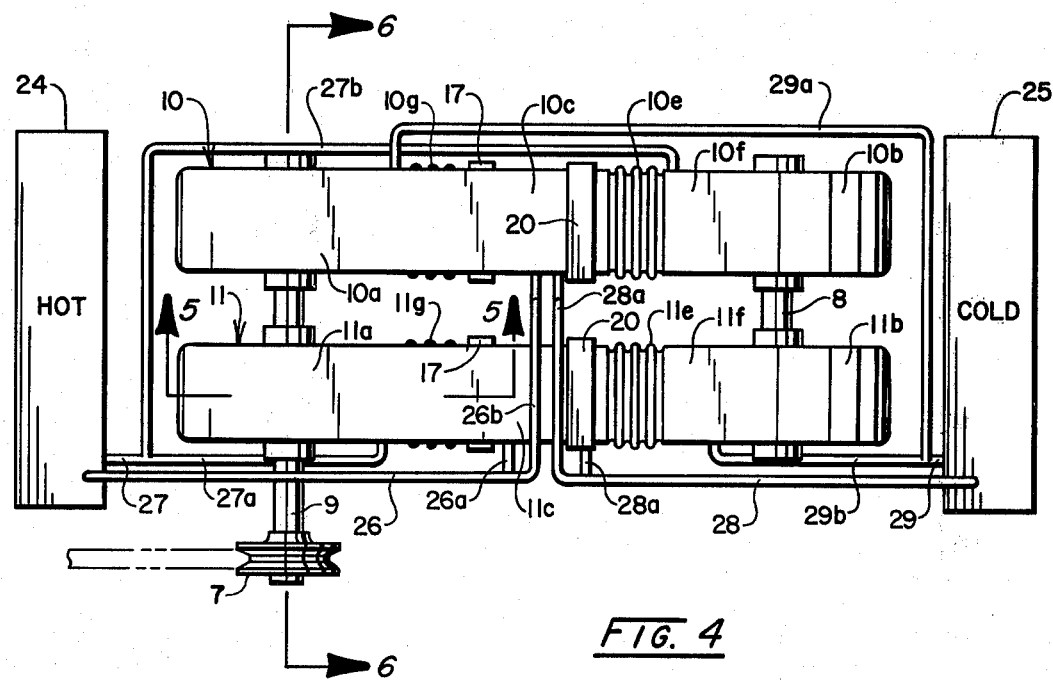
FIG. 4 shows a top plan view of the heat engine of FIG. 3.
Figure 6:
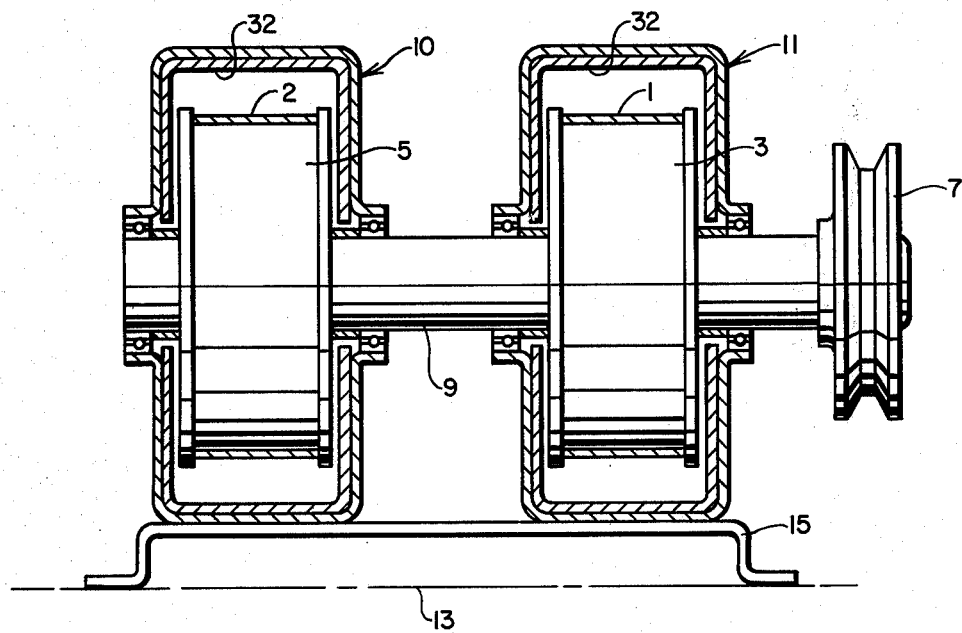
FIG. 6 shows an enlarged sectional view of a portion of the engine of FIGS. 4 and 5 as viewed along the line 6—6 of FIG. 4.

The belts 1, 2, the pulleys 3, 4, 5, 6 and 7, and the shafts 8 and 9 are shown at least diagrammatically in FIG. 1. However, some of these elements are not shown in the drawings of FIGS. 3 and 4 which show the actual structure as it appears with the belts hidden by the housings 10 and 11. In FIGS. 2, 3 and 4 the belts 1 and 2 are hidden by being enclosed within the housings 11 and 10 respectively. The pulleys 3, 4, 5 and 6 are also hidden in these Figures by the housings 10 and 11. The shafts 8 and 9 and the pulley 7 are indicated in FIGS. 3 and 4. The belts 1 and 2 and the pulleys 3 and 5 as well as pulley 7 are shown in FIG. 6.

Both of the housings 10 and 11 (FIG. 4) are secured on their right ends, as viewed in FIG. 3, by means of brackets 12 in a stationary position to the floor or other support 13 by means of suitable fasteners 14. The left ends of these housings 10 and 11 are provided with other brackets 15. The brackets 15 are secured to the housings 10 and 11 by suitable means such as the fasteners 16 shown in FIG. 5. These brackets 15 are positioned on the support 13 without being fastened thereto so that they are free to shift and slide longitudinally with the housings 10 and 11.

Each of the housings 10 and 11 is divided into two parts. The housing 10 is provided with a left portion 10a and a right portion 10b while housing 11 is provided with a left portion 11a and a right portion 11b. Considering housing 11, for example, its left portion 11a is sufficiently large to encircle the pulley 3 and extend beyond the pulley 3 with two hollow tubular arms 11c and 11d. Arm 11c is longer than arm 11d. Arm 11c extends to an expandable tubular bellows 11e which connects the arms 11c to the short arm 11f of the right housing portion 11b. The short tubular arm 11d of the left housing portion 11a is connected at its end to another flexible expandable tubular bellows 11g which connects to a long tubular arm 11h of the right housing portion 11b. The two bellows 11e and 11g allow relative movement between the left and right portions 11a and 11b of the housing 11 twoard and away from each other.

In addition, the arm 11h is provided (See FIGS. 3 and 5) with an upwardly extending arm 17 having a circular hole in it through which a rod 18 freely passes. The rod 18 supports a coiled compression spring 19 which reacts between the arm 17 and the left housing portion 11a to urge the two housing portions 11a and 11b away from each other. Another downwardly projecting arm 20 (FIG. 3) extends from the tubular arm 11c and this slidably supports, in a similar manner, another rod 21 which carries another coiled compression spring 22 which reacts between the arm 20 and the right housing portion 11b to likewise urge the housing portions 11a and 11b away from each other. The reason for the two sets of arms and compression springs 19 and 22 is to provide symmetry and minimize any binding condition which might otherwise arise by the transom-latch action.

It is apparent that the belt 1 is housed to pass through the tubular arms 11c, 11f, 11d and 11h in its path around the two pulleys 3 and 4. In this manner, the housing 11 completely encircles the belt 1 and the two pulleys 3 and 4.

In a similar manner, the housing 10 is provided with identical structure to that of housing 11. It has four tubular arms corresponding to arms 11c, 11f, 11d and 11h, the two arms; 10c, and 10f being shown in FIG. 4. It also has corresponding bellows 10e and 10g and springs and related members such as springs 19 and 22. Their functions are all identical. In this same manner, this housing 10 completely houses the pulleys 5 and 6 and the belt 2 in its path around the pulleys.

Figure 5:
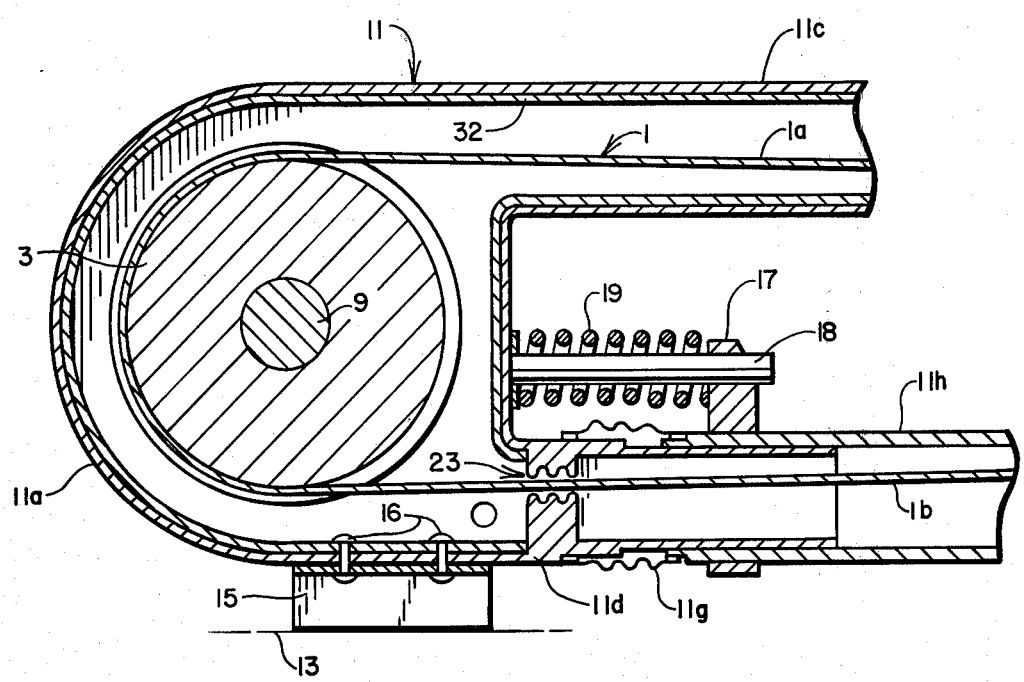
FIG. 5 shows an enlarged sectional view of a portion of the engine of FIGS. 3 and 4 as viewed along the line 5—5 of FIG. 4.

As shown particularly in FIG. 5, the tubular arm 11d is provided with a restricted opening 23 in the region of the bellows 11g. The arm 11d is also telescoped into the arm 11h so that each arm acts as a longitudinal guide for the other. Likewise, although not shown, the structure in the region of the other three bellows 11e, 10g and 10e is identical. The arms telescope within each other and are provided with restricted passages such as passage 23. The purpose of the restricted passages corresponding to passage 23 is to minimize heat transfer through these passages 23 in order to maintain as high a temperature differential as possible between opposite sides of the passages.

Beyond the left end of the housings 10 and 11 is a heat generator 24 which is intended to supply heat to various portions of the device. Beyond the right end of the housings 10 and 11 is a cooling unit 25 intended to cool other portions of the device. Suitable piping is provided from these units 24 and 25 to direct a consistent flow of hot and cold fluid, which may probably be air, to the regions of the device selected for heating and cooling as already indicated in FIG. 2. To restate, the belt regions 1b and 2b are cooled while the regions 1a and 2a are heated. The piping is intended to convey the heat or cooling so that this condition occurs.

A pipe 26 (FIGS. 3 and 4) is used to supply heat from the heat unit 24 by way of branch pipes 26a and 26b to the inside of housing arms 11c and 10h, respectively. The fluid supplied through these pipes is intended to pass around the belt portions 1a and 2a and then be exhausted through branch pipes 27a and 27b to return pipe 27 feeding back into the heater unit 24.

Cooling is accomplished by feeding cold fluid from pipe 28 through two branch pipes 28a and 28b to the inside of housing arms 11h and 10c, respectively. The cold fluid entering into tubular arms 11h and 10c passes cool around appropriate belt portions 1b and 2b. The cool fluid exhausted from the housings by means of branch pipes 29a and 29b is returned by pipe 29 to the cooling unit 25. The pipe arrangement, for facilitating its understanding with relationship to the various portions of the housings 10 and 11, is shown in simplified form in FIG. 2. From the piping there shown, it should be apparent, upon careful study, that the heat is directed through the pipes from the heat unit 24 to provide heat at the regions 1a and 2a of the belts and cool fluid is supplied from the cooling unit 24 to the regions 1b and 2b.

With the arrangement and structure as shown, and with the suggested application of the correct amounts of heat and cold, the belts 1 and 2 rotate in the direction of the arrows 30 and 31 (FIG. 1) to drive the pulleys each in the same direction so that the unit acts as a prime mover.

The purpose of the springs 19 and 22 is to maintain the belts 1 and 2 under consistent tension.

In order to understand the operation of the device and how it is caused to rotate in a given direction, it is helpful to show the forces on a single set of pulleys, such as 3 and 4, for example. Referring to FIG. 1, if F3 and f3 are considered to be the forces exerted on the pulley 3 by the belt 1, and pulley 3 has a radius of R, which is larger than the radius r of the smaller pulley 4, and F4 and f4 represent the forces on the pulley 4 by the belt 1, initially (before heating and/or cooling) F3 equals F4 equals f3 equals f4 because the only forces acting on the pulleys are the forces of the compression springs 19 and 22. As region 1a is heated and region 1b is cooled, assuming that shafts 8 and 9 are prevented from opposite rotation and there is no slippage of the belt 1 on the pulleys 3 and 4, F3 and F4 (equal and opposite) increase and f3 and f4 (equal and opposite) decrease due to contraction in region 1b and expansion in region 1a of the belt 1. As this occurs, F3 times R minus f3 times R becomes greater than F4 times r minus f4 times r. This creates an unbalanced force condition which urges movement of the belt in the direction of the arrow 30.

The forces and effects of heating and cooling on the other pulleys 5 and 6 and belt 2 are substantially the same, except the same pulley 5 is on the same shaft 9 as the large pulley 3, and the large pulley 6 is on the same shaft as the small pulley 4. Therefore, the lower portion 2a is heated and the upper portion 2b is cooled. Physically, these are the differences. However, by applying the same reasoning as for the pulleys 3 and 4 and the belt 1, it can be determined that the belt 2 moves in the direction of the arrow 31 which is the same direction as the movement of the belt 1, indicated by arrow 30.

Because the shafts 8 and 9 connect the pulleys 3, 5 and 4, 6 together, aside from any allowable deflection, the angular velocities of the shafts 8 and 9 and the pulleys 3, 4, 5 and 6 are always the same for each. The movement of the pulleys and the belts is achieved by changes in linear velocities of the peripheries of the pulleys and the belts because of the thermal expansion and contraction of the belts due to heating and cooling. In addition, the connecting together of the two sets of pulleys by the shafts 8 and 9 prevents reverse rotation of the pulleys with respect to each other which would otherwise balance out the forces and prevent actual continuous rotation in a given direction. With the present system, the unbalance of forces is relieved dynamically by rotation of the belts and the pulleys in a single direction at a time.

After heating and cooling is arrested, the forces causing rotation are relieved and the force system is balanced so that rotation is arrested as equilibrium results.

With the system described, in order to prevent slippage of the belts, they are maintained under tension as previously described by means of the springs 19 and 22. It should be evident that the expansion and contraction of the belts causes shifting of the support brackets 15 along the support 13. This is the reason that the brackets are allowed to slide freely. Although there is no specific structure shown to permit flexing of the piping system relating to the pipes 26, 27, 28 and 29, and the related branch pipes, as long as the amount of movement is small, the pipes will probably have sufficient deflection within themselves to compensate for the elongation and contraction of the belts. Otherwise, the pipes can be made of more flexible materials or provided with expansion joints.

In order to minimize heat transfer through the walls of the housings 10 and 11 and to maintain a high efficiency as possible, the interior walls of the housings can be provided with insulation 32, as indicated in FIGS. 5 and 6.

Figure 7:
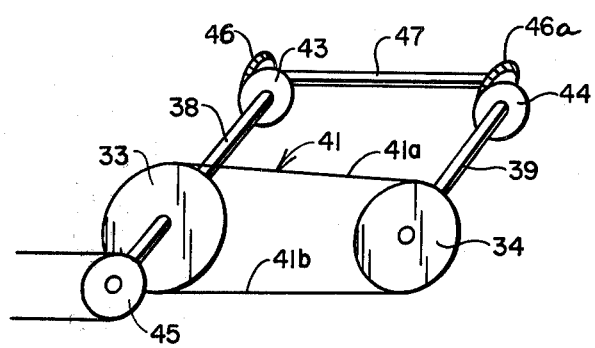
FIG. 7 shows a simplified perspective representation of an alternative construction of the engine.

An alternate structure is shown in FIG. 7 and provides another form of the prime mover. One set of pulleys, such as 33 and 34, is secured to the shafts 38 and 39 and provided with a driven pulley 45 just as before, but the opposite ends of the shafts 38 and 39 are secured to bevel gears 43 and 44 which are engaged respectively with other bevel gears 46 and 46a maintained on shaft 47 which extends at right angles to the shafts 38 and 39. The shaft 47 is journalled on suitable means not shown. The purpose of the bevel gears and the shaft is to prevent relative angular rotation between the shafts 38 and 39 so that the pulleys 33 and 34 of the belt 41 will rotate properly upon the application of heat and cold in the same manner as applied for the structure shown in FIG. 1. The pulleys 33 and 34 and the belt 41 are preferably contained in a housing such as housing 11 and the hot air and cold air are sent respectively to its regions 41a and 41b similarly as previously described from the heat unit 24 and the cooling unit 25.

Figure 8:
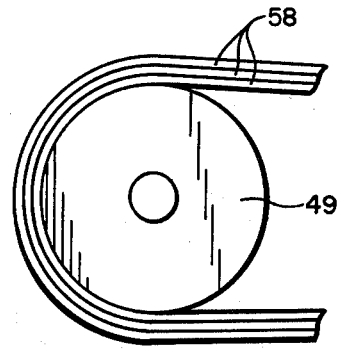
FIG. 8 shows a fragmentary sectional view of a portion of an alternative construction of the engine.

Because the belt is preferably made of metal, the thicker the metal the stiffer it becomes and the less is its facility to bend around pulleys. Therefore, in order to increase the power of the unit by increasing the thickness of the belt, it can be made up of a plurality of belts 58, as shown in FIG. 8, where the plurality of belts are sandwiched against each other and are shown bent around a pulley 49. As is explained hereinafter, the horsepower output of the unit is related to the size of the belt used.

The devices indicated in FIGS. 1, 7 and 8 can also be used as refrigerators. Instead of utilizing the forces provided by heating and cooling to drive a pulley 7 or other device, the pulley 7 or the pulley 45 can be driven to drive the other pulleys such as 3, 4, 5, 6, 33, 34, and 49 and create a cooling condition. If the unit shown in FIG. 1 is driven in the direction of the arrows 30 and 31, regions 1b and 2b contract while regions 1a and 2a stretch. When 1b and 2b contract, 1b and 2b heat up to radiate heat to their surroundings. When 1a and 2a stretch, they cool off to cause absorption of heat from their surroundings which can be the region or regions to be cooled. The amount of stretch allowed is controlled by controlling the relative diameters of the pulleys so that stretching or contracting never occurs above the elastic limit of the belts. If so, the device does not operate properly.

The refrigeration cycle is possible on the assumption that the cooling and heating occurs because of a change in volume of the metal as the metal is stretched and contracted. Poisson's ratio is related to the fact that the volume of a metal increases as it is stretched. If so, cooling occurs because the same amount of metal in the larger volume (like expansion of gas) contains the same total amount of heat. It is merely distributed over a larger volume which then has a lower temperature. Then, after absorbing heat, the metal is contracted to the original volume, it necessarily becomes hotter. This relative heating and cooling by stretching and contracting the belts permits the continuing of the refrigeration cycle.

As a specific example of the power requirements for a specific structure, we shall assume the power requirements for a single set of pulleys, such as 3 and 4.

Further assume the following:
Diameter of pulley 4=3.000 inches
Diameter of pulley 3=3.050 inches
Then,
circumference of pulley 4=9.4248 inches
circumference of pulley 3=9.5818 inches
The circumference of pulley 3 minus the circumference of pulley 4 equals 9.5818 minus 9.4248 or 0.157 inches which is required or total stretch of the belt encircling pulley 3 and 4.

unit stretch=(total stretch/length stretched)=0.157/9.4248=0.0166

Therefore, unit stretch equals 0.0166 inches/inch of length.

For a one degree F. rise in temperature, steel will stretch 0.00006 inches/inch of length.

0.0166/0.00006=276.7 deg. F. which is the temperature difference required to stretch or contract a steel belt 0.157 inches, the required amount of stretch.

The average specific heat of iron in the 32° to 392° F. range is 0.115 BTU per lb. per degree F. Assuming a belt thickness of 0.010 inches, 2 inches wide and a 24 inch length exposed in the heat transmission chamber; the volume of metal is 2×24×0.010 or 0.48 cubic inches. 0.48 cubic inches of steel times 0.283 lbs. per cubic inch equals 0.135 lbs. weight of metal involved in heat exchange. 0.135 lbs. times 0.115 BTU per lb. per F° =0.0155 BTU per F°. Average temperature increase =276/2=138°. 0.0155 times 138=2.139 BTU. 0.707 BTU=1 H.P. Assuming enough heat is transferred to achieve the 276 degree temperature change in one second, the power output is:

2.139/0.707=3.025 H.P. at 100% efficiency.

Figure 9:
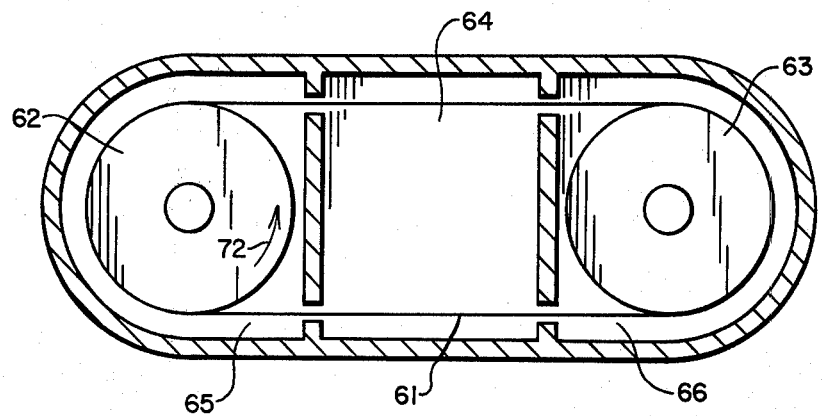
FIG. 9 illustrates another embodiment of my invention.
Figure 10:
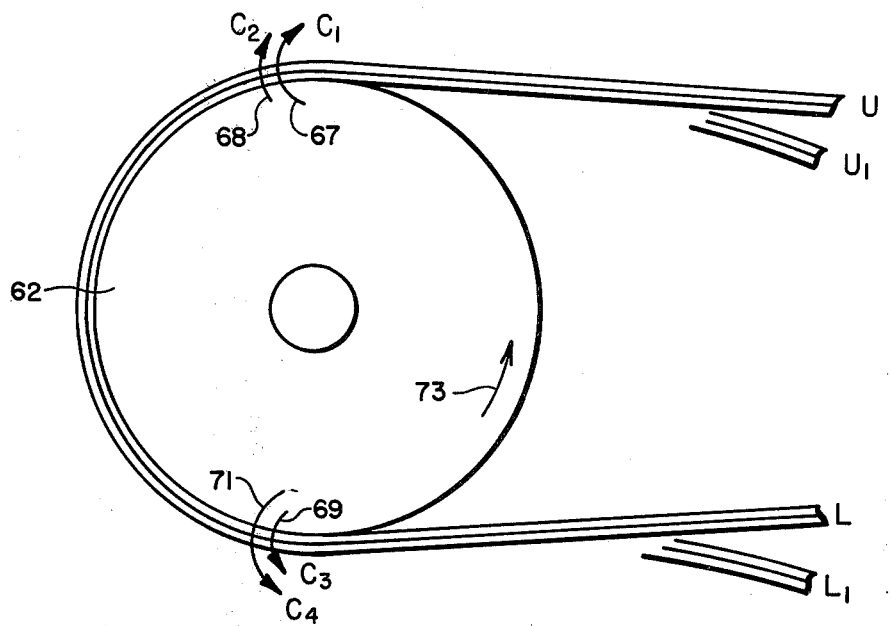
FIG. 10 shows a fragmentary portion of the structure of FIG. 9 on an enlarged scale.
Figure 11:
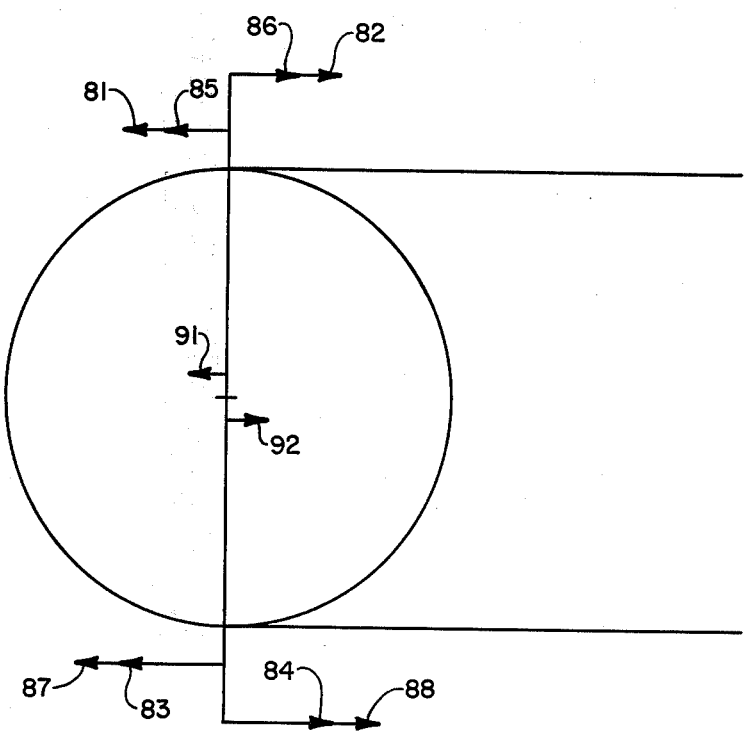
FIG. 11 illustrates the resolution of forces acting on the belt at the upper and lower parts of FIG. 10.

In FIGS. 9, 10 and 11, I have illustrated an alternate design which will operate with either a small or large temperature difference. This can be accomplished by using a bimetallic band 61 operating over two pulleys 62 and 63 as shown in FIG. 9. In this arrangement, heating in the chamber 64 and cooling in the chambers 65 and 66 result in changes in forces transverse to the band.

Referring to FIG. 10, which is an enlarged view of the left portion of FIG. 9, the band when wrapped around the pulley exerts a couple at the upper and lower points of tangency due to the elasticity of the band. These forces are indicated by the curved arrows 67, 68, 69 and 71.

Initially, $C_1=C_3$. In operation, $C_4>C_2$.

To begin operating, the pulley 62 is rotated in the direction indicated by the arrow 72 by an outside source. The bimetallic band 61 emerging from the heating chamber 64 will initially have a shape U but will tend to assume the curvature indicated by position $U_1$ (See FIG. 10). This curvature is in a direction tending to conform to the curvature of the pulley 62 and will result in a reduction in the couple at the top point of tangency. The band while in contact with the pulley and passing through the cooling chamber will be cooled, and though initially having the position indicated by the letter L, will soon tend to assume the position indicated by $L_1$. This curvature is in opposition to the curvature of the pulley and results in an increase in the couple at the lower point of tangency. Resolution of the component forces results in a couple tending to rotate the pulley in the direction shown by arrow 73. The composition of the bimetallic band is such that the outer layer of the band in the illustration will have greater expansion when heated than the inner layer.

FIG. 11 is added to illustrate the resolution of forces. Therein arrows 81, 82, 83 and 84 represent couples $C_1$ and $C_3$ of FIG. 10. Arrows 85, 86, 87 and 88 represent components after initial operation, and arrows 91 and 92 represent forces after resolution.

Although only certain embodiments of the invention have been shown and described, it should be clearly understood that the invention can be made in many different ways without departing from the true scope of the invention as defined by the appended claims.

I claim:
1. A heat engine comprising:
two spaced pulleys;
a continuous belt which is mounted on said pulleys in a closed loop to provide two parallel lengths of belt each extending between the two pulleys and each extending tangentially from each of the two pulleys;
means for prestressing the belt; and
means for changing the length of one of the lengths of belt relative to the other length by creating a temperature difference between one of said lengths and the other said length
in which the continuous belt is of metal and consists of a plurality of belts in layers one on the other.
2. A heat engine comprising:
two spaced pulleys;
a continuous belt formed of single metal which is mounted on said pulleys in a closed loop to provide two parallel lengths of the belt each extending between the two pulleys and each extending tangentially from each of the two pulleys;
means for prestressing the belt; and
means for changing the length of one of the lengths of belt relative to the other length by creating a temperature difference between one of said lengths and the other said length,
I. in which the continuous belt consists of a plurality of metal strips, and
II. in which there are provided;
(1) a pair of rotatable shafts on each of which one of the two pulleys is mounted;
(2) means for transmitting motion of one shaft to the other shaft to rotate it comprising
(a) an additional pair of pulleys mounted one on each of the shafts spaced on said shaft from the first named pulley thereon;
(b) a second continuous belt mounted in a closed loop around said second pair of pulleys wherein one pulley of each pair of pulleys has a larger diameter than the other pulley of said pair; and
(3) means comprising a spring for maintaining a tension on said belts; and
III. in which the means for creating a temperature difference between the lengths comprises means for heating one of said lengths.

* * * * *